though other flame detecting devices could be employed.

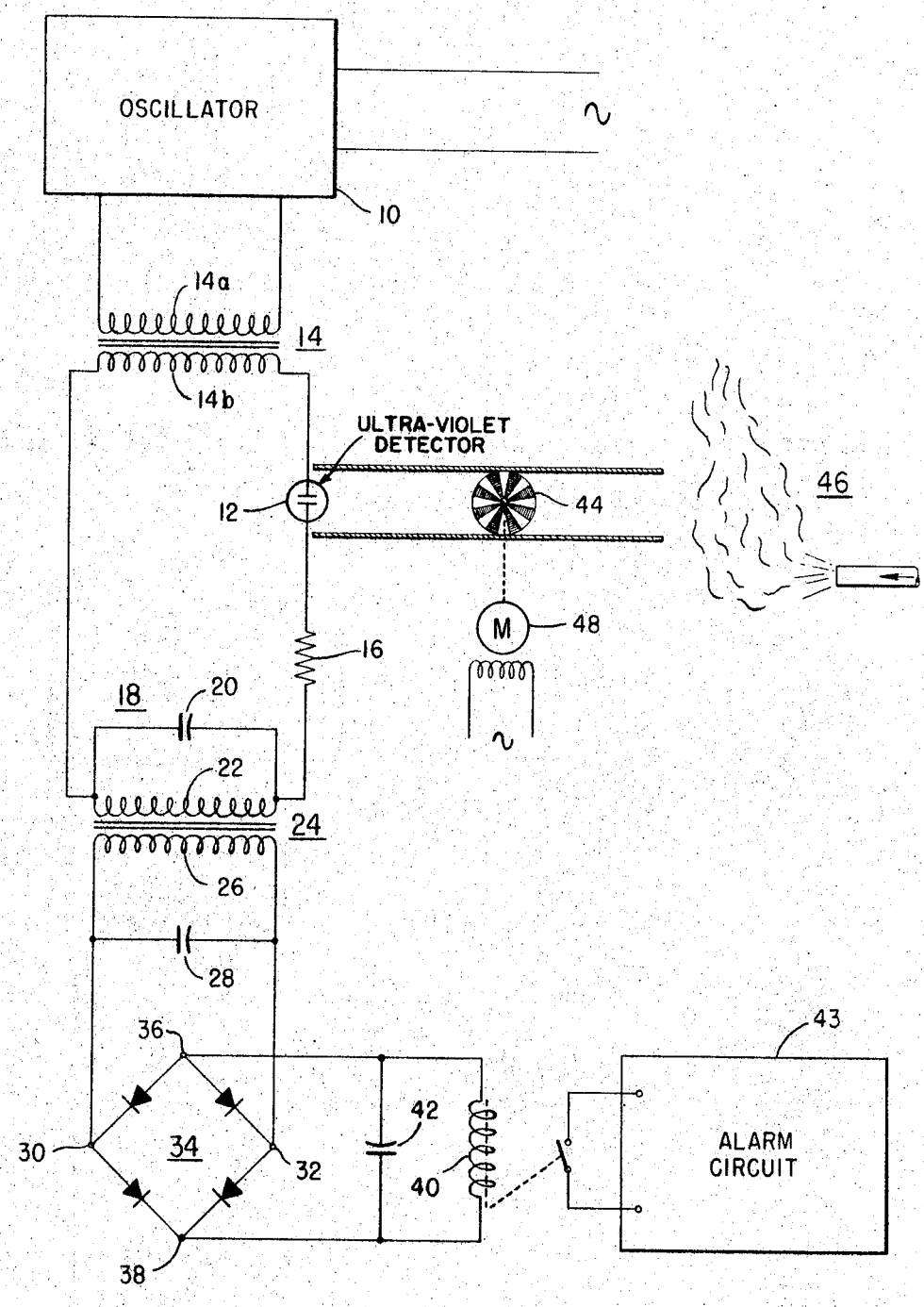

3,299,416
FAIL-SAFE FLAME DETECTOR
Harold H. Koppel, Cleveland, Ohio, assignor to Bailey Meter Company, a corporation of Delaware
Filed Mar. 27, 1964, Ser. No. 355,387
8 Claims. (Cl. 340—228)

When developing a flame detector the engineer must be sure his device is unquestionably reliable. If a flame failure occurs or if a component in the detector circuit fails an alarm must sound. This invention relates to a self-checking flame detector. In particular this invention relates to a dynamic fail-safe flame detector employing a shutter operated modulator.

One dynamic fail-safe flame detector now in commercial usage requires a relatively slow periodic interruption of flame radiation impinging on the detector tube. This necessitates a mechanical relay between the detector device and the flame which is often difficult to mount. Additionally the relay, because of its continually opening and closing of contacts, would probably have limited life, increasing the probability of nuisance failures. Another scheme for fail-safe flame detection makes use of a rotary shutter operating at 1800 revolutions per minute. Although this eliminates the need for a contact operated shutter it also has obvious shortcomings. With the detector operating from a 60 cycle supply the flame is blocked from the detecting device every other half cycle. In essence the shutter acts as a rectifier and causes a D.-C. relay to be energized so long as radiation to the detecting device is periodically interrupted. Should the detecting device self fire or be shorted or in some other way no longer respond to beam interruptions, the rectifying action is lost. Only an A.-C. component appears across the D.-C. relay thereby causing it to de-energize and sound an alarm. Rectifying schemes such as this suffer from one very important limitation; namely, that repeated firing in one direction may cause the detector to self fire in that direction only. Another problem encountered in the rotary shutter rectifying scheme is that of synchronizing the rotating shutter with line frequency.

My invention also makes use of a rotary operated shutter but in a manner which causes modulation of the supply frequency thereby producing sum and difference frequencies. By operating the tube at a beat frequency it fires on both cycles of the line voltage thereby eliminating unsafe failures due to self firing in one direction. It also eliminates the need for critical alignment between the power line frequency and shutter rotation.

It is an object of my invention to provide a fail-safe flame detector operating from a sum or difference frequency.

It is also an object of my invention to provide a fail-safe flame detector employing a mechanical modulator of line frequency.

Another object of my invention is to provide a fail-safe flame detector which employs a single or double resonant alarm circuit.

Various other objects and advantages will appear from the following description of one embodiment of the invention, and the novel features will be pointed out in the appended claims.

The drawing shows a schematic diagram of a flame detector using a motor operated shutter and a double resonant alarm circuit.

Referring to the figure, I show an oscillator 10 transformer 14 having a primary winding 14a and a secondary winding 14b. One form of detector tube which is particularly well suited for my invention is the ultraviolet detector. It so happens my circuit was developed using an ultraviolet detector tube although other flame detecting devices could be employed.

Also connected to the detector tube 12 through a current limiting resistor 16 is a double resonant circuit 18. To complete my detector circuit the second terminal of secondary winding 14b is also connected to the resonant circuit 18. The resonant circuit 18 includes a filter capacitor 20 connected across the terminals of primary winding 22 of a transformer 24. Connected across a secondary winding 26 is a second filter capacitor 28 thereby completing the double resonant circuit which blocks all but one preselected narrow frequency band.

When the preselected frequency passes through resonant circuit 18 an alternating voltage appears at terminals 30 and 32 which is rectified by a full wave rectifier bridge 34. The rectifying bridge 34 is effectual to convert the alternating voltage passed by resonant circuit 18 to a direct current voltage at terminals 36 and 38. Connected to terminals 36 and 38 is a direct current alarm relay 40 shunted by a delay dropout capacitor 42. Although an alternating current relay could be employed in the alarm circuit the direct current method contains one very important advantage; namely, the time delay dropout feature. When monitoring a flame momentary interruptions could occur which would cause an alternating current relay to sound an alarm. A direct current relay, on the other hand, shunted by a delayed dropout capacitor provides the necessary time delay to prevent nuisance alarms.

Connected to the direct current relay 40 and actuated thereby is an alarm circuit 43 shown here in block form. The alarm circuit is not detailed in this description since it is not believed necessary for an understanding of my invention. Suffice it to say the alarm circuit would include a flashing light, horn or some other well-known indicating device. Additionally, the relay 40 may operate suitable control devices for shutting off the fuel so as to prevent a hazardous condition from occurring on flame-failure. Whichever is employed, it should be connected to operate when relay 40 is de-energized.

Physically located between a flame, generally indicated at 46, is a rotating shutter 44 which interrupts the ultraviolet radiation detected by the detector tube 12. An electric motor 48 rotates the shutter 44 at a fixed number of revolutions per minute. By slotting the rotary shutter 44 a fixed number of flame interruptions per second can be generated which modulates the supply frequency as will be explained. The number of slots necessary to produce a given number of interruptions per second is determined by motor speed. For example, suppose the motor operated shutter runs at 3600 revolutions per minute, 60 revolutions per second, then for a desired number of interruptions the number of slots will be determined by dividing the desired rate of interruption by 60 revolutions per second.

In operation, the number of flame interruptions per second adds to or subtracts from the supply frequency according to the following equation.

$$E \sin \alpha \sin \beta = \frac{E}{2}[\cos (\alpha - \beta) - \cos (\alpha + \beta)]$$

Where: E is the supply voltage $\alpha$ equals $2\pi t$ times the oscillator frequency $\beta$ equals $2\pi t$ times the number of interruptions.

Substituting for the $\alpha$ and $\beta$ terms and cancelling E from both sides the above equations reduces to:

$$\sin (2\pi \times 460t) \sin (2\pi \times 420t) =$$
$$\frac{1}{2}[\cos 2\pi \times 40t - \cos 2\pi \times 880t]$$

The right side of this latter equation contains the sum and difference frequencies developed by the rotary shutter modulating the oscillator frequency. Assuming an oscillator 10 frequency of 460 cycles and the number of flame interruptions at 420 the difference frequency will be 40 cycles and the sum 880 cycles. To produce 420 interruptions per second the rotary shutter 44 has seven slots and rotates at 3600 revolutions per minute.

If the double resonant circuit 18 is tuned to either the sum or difference frequency a direct current signal will appear at terminals 36 and 38. Relay 40 will be energized and remain so, as long as the resonant frequency is present. In other words, relay 40 remains energized as long as the detector tube 12 responds to the flame as interrupted by the rotating shutter 44. With a sharply tuned resonant circuit 18 neither the 420 interruptions per second or the 460 cycle per second supply frequency will be passed to the full wave rectifier and hence will not energize the alarm relay 40. For example, if the tube self fires it is no longer responsive to interruptions by the rotary shutter 44. Only the 460 cycle per second supply frequency will appear across resonant circuit 18 and the relay 40 will be de-energized. If the shutter should fail, again only the 460 cycle supply frequency appears across the resonant circuit and the relay 40 would be de-energized. In any possible failure my circuit fails safe, that is, gives an alarm that something is not functioning properly. Either the flame is out or the detector has malfunctioned.

It should be understood the frequencies mentioned in this description are only for purposes of explanation. Obviously other frequency ranges could be used with only slight modification to the resonant circuit 18. However, the lower the beat frequency the more bulky will become the components in the tuned circuit. On the other hand for higher frequencies more and narrower slots are required in the rotating shutter 44.

It should also be understood that other changes can be made in the disclosed embodiment of my invention without departing from its spirit as set forth in the appended claims.

What I claim as new and desire to secure by Letters Patent in the United States is:

1. Apparatus for fail-safe flame detection, comprising, a detector means sensitive to the existence of a flame, means for producing a periodically varying voltage across said detecting means, a resonant circuit including a transformer having a primary and secondary winding, said primary winding connected in series with said detecting means and said voltage producing means, alarm means connected to said secondary winding and responsive to a voltage appearing across said winding, and shutter means for interrupting the flame impinging on said detecting means thereby modulating said periodically varying voltage and producing a cyclically varying voltage equal to the resonant frequency of said resonant circuit.

2. Apparatus as set forth in claim 1 wherein said detector means includes a tube having a first and second electrode sensitive to ultraviolet radiation emitting from said flame.

3. Apparatus as set forth in claim 2 wherein said shutter means includes a slotted rotating disk.

4. Apparatus for fail-safe flame detection, comprising, a detector means sensitive to the existence of a flame, means for producing a periodically varying voltage across said detecting means, a transformer having a primary and secondary winding, said primary winding connected in series with said detecting means and said voltage producing means, a capacitor connected across said primary winding thereby forming a resonant circuit, alarm means connected to said secondary winding and responsive to a voltage appearing across said winding, and shutter means for interrupting the flame impinging on said detecting means thereby modulating said periodically varying voltage and producing a second periodically varying voltage the frequency of which is equal to the resonant frequency of said single resonant circuit.

5. Apparatus for fail-safe flame detection, comprising, a detecting means sensitive to the existence of a flame, means for producing a voltage across said detecting means having a fixed number of cycles per second, a transformer having a primary and secondary winding, said primary winding connected in series with said detecting means and said voltage producing means, a first capacitor connected across said primary winding thereby forming one part of a double resonant circuit, a second capacitor connected across said secondary winding thereby completing a double resonant circuit with said first capacitor and said primary winding, an alarm means connected to said secondary winding and responsive to a voltage appearing across said winding, and shutter means for interrupting the flame impinging on said detecting means thereby adding to and subtracting from said fixed number of cycles per second produced by said voltage means, said sum or difference frequency being equal to the resonant point of said double resonant circuit.

6. Apparatus as set forth in claim 5 wherein said alarm means includes a rectifier circuit connected across said secondary winding to produce a direct current signal and a relay connected to said rectifier circuit to be energized by a signal passed by said double resonant circuit.

7. Apparatus as set forth in claim 6 including a delay dropout capacitor connected across said alarm relay thereby preventing nuisance alarms.

8. Apparatus as set forth in claim 5 wherein said voltage producing means includes a transformer having a primary and secondary winding, said secondary winding connected to said detecting means and said first capacitor, said primary winding connected to an electronic oscillator producing a fixed number of cycles per second.

References Cited by the Examiner

UNITED STATES PATENTS 2,804,131 8/1957 Ator _____ 158—28
3,146,822 9/1964 Ray _____ 340—228 X NEIL C. READ, *Primary Examiner.*

R. M. ANGUS, D. K. MYER, *Assistant Examiners.*